United States Patent [19]

McAllister

[11] Patent Number: 4,805,867

[45] Date of Patent: Feb. 21, 1989

[54] STEERING WHEEL PLATFORM

[76] Inventor: Bruce E. McAllister, 6300 Montgomery, N.E. #331-W, Albuquerque, N. Mex. 87109

[21] Appl. No.: 102,023

[22] Filed: Sep. 28, 1987

[51] Int. Cl.⁴ .......................................... A47B 37/00
[52] U.S. Cl. .................... 248/441.1; 248/454; 108/44
[58] Field of Search ............. 248/441.1, 447.2, 454, 248/247, 444, 447.1, 152, 219.4; 108/44; 224/276

[56] References Cited

U.S. PATENT DOCUMENTS

| | | | |
|---|---|---|---|
| 1,273,239 | 7/1918 | Leon et al. | 248/126 X |
| 1,622,586 | 3/1927 | Hoffman | 224/276 |
| 1,717,433 | 7/1931 | Bragg et al. | |
| 1,883,714 | 10/1932 | Gray | 248/447.2 X |
| 1,977,507 | 10/1934 | Edwards et al. | 224/276 |
| 1,991,029 | 2/1935 | Pinney | |
| 2,244,861 | 6/1941 | Walker, Sr. | 108/41 |
| 2,255,654 | 9/1941 | Davis et al. | 248/444 |
| 2,271,294 | 1/1942 | Ford | 248/444 |
| 2,299,025 | 10/1942 | McGinley | 108/44 |
| 2,746,821 | 5/1956 | Schroeder | 108/44 |
| 3,643,606 | 2/1972 | Vise | 108/44 |
| 3,739,478 | 6/1973 | Elenberger | 33/75 R |
| 3,952,988 | 4/1976 | Easterly | 108/44 X |
| 4,375,881 | 3/1983 | Mitchell | 248/447.2 |
| 4,453,788 | 6/1984 | Russell | 312/231 |
| 4,586,730 | 5/1986 | Shulyak | 248/444 X |

FOREIGN PATENT DOCUMENTS 2025003 12/1971 Fed. Rep. of Germany ........ 108/44

Primary Examiner—Ramon S. Britts
Assistant Examiner—Karen J. Chotkowski
Attorney, Agent, or Firm—Deborah A. Peacock; Robert W. Weig

[57] ABSTRACT

This invention is a readily attachable and removable portable platform for use in conjunction with a vehicle steering wheel. The platform contains slots located on its edges which facilitate detachable mounting in a variety of positions on steering wheel rims of various diameters and grip thicknesses. One of the slots contains notches for adjusting the position of the platform relative to the steering wheel.

6 Claims, 3 Drawing Sheets

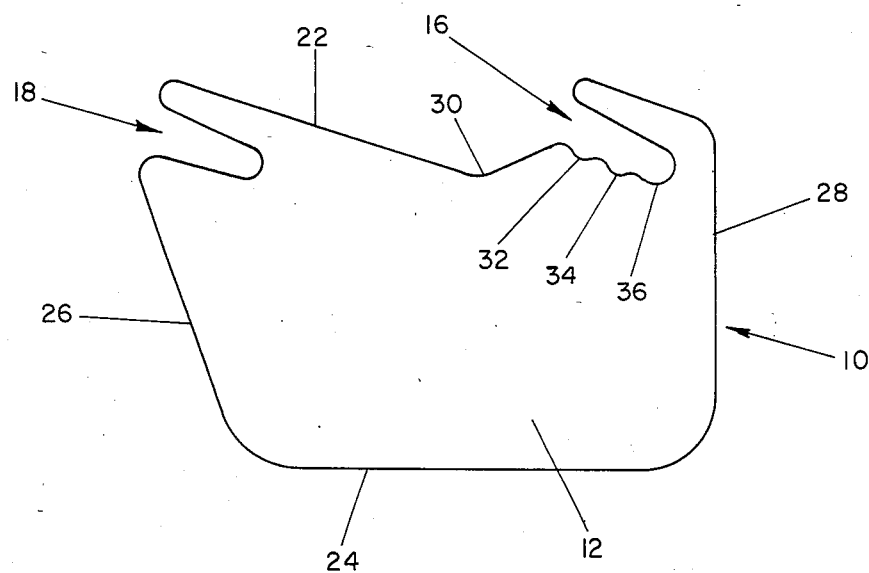
FIG—1
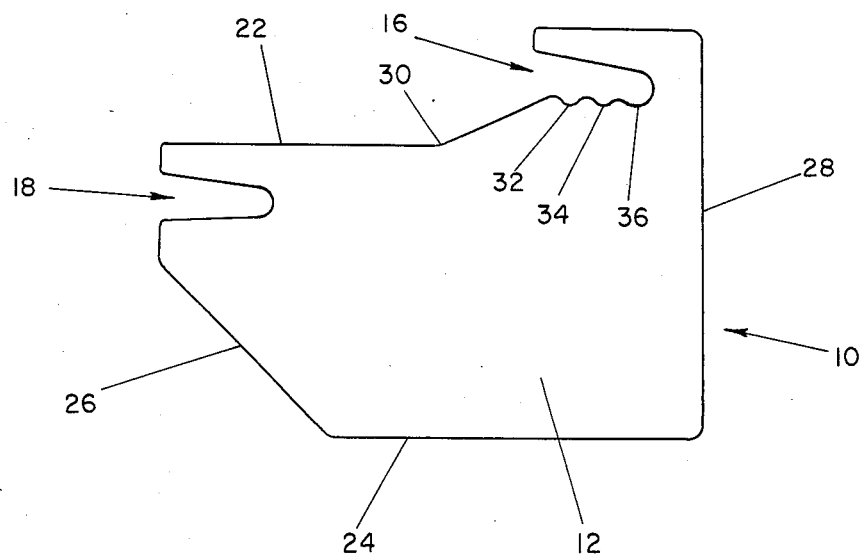
FIG — 2

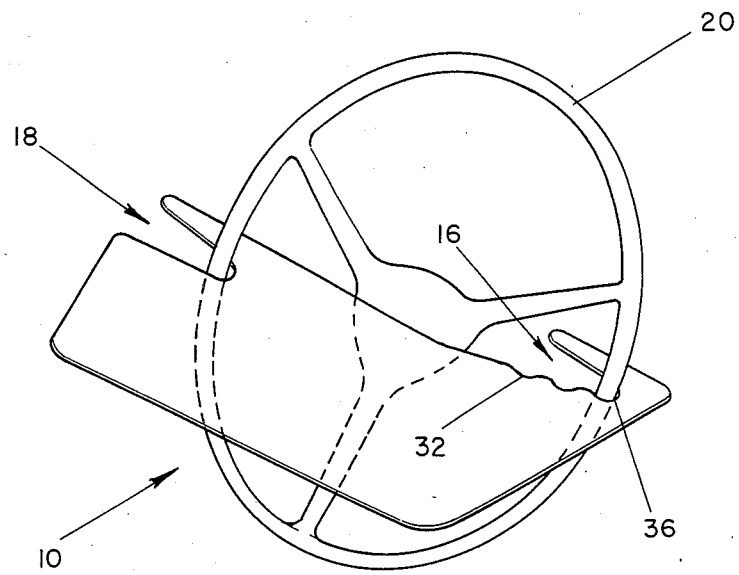
FIG—3
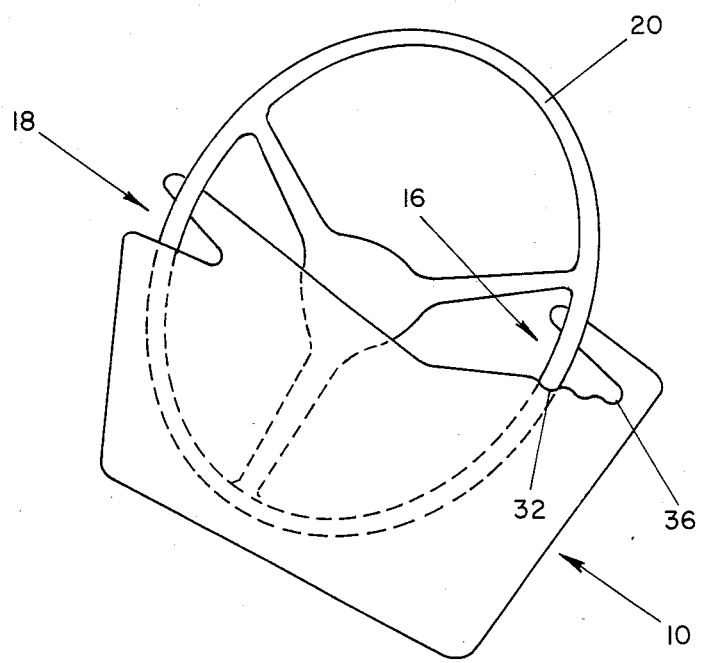
FIG—4

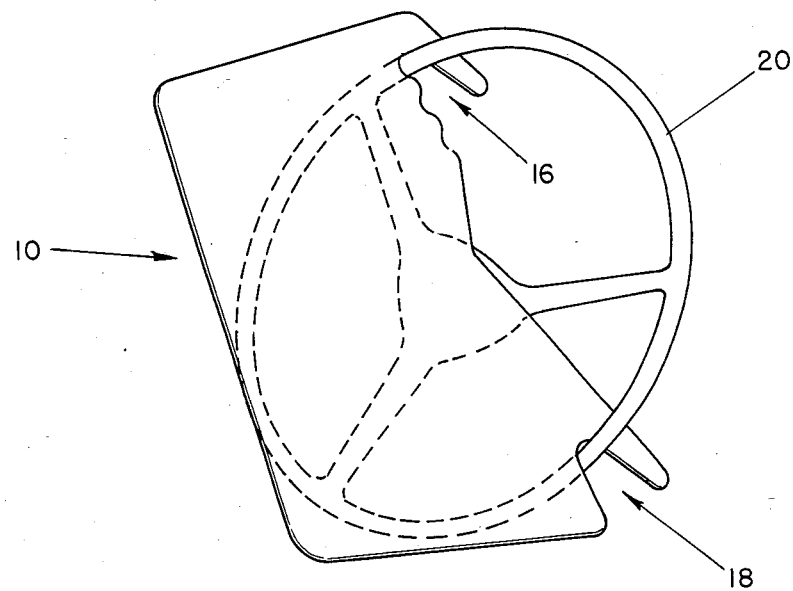
FIG—5
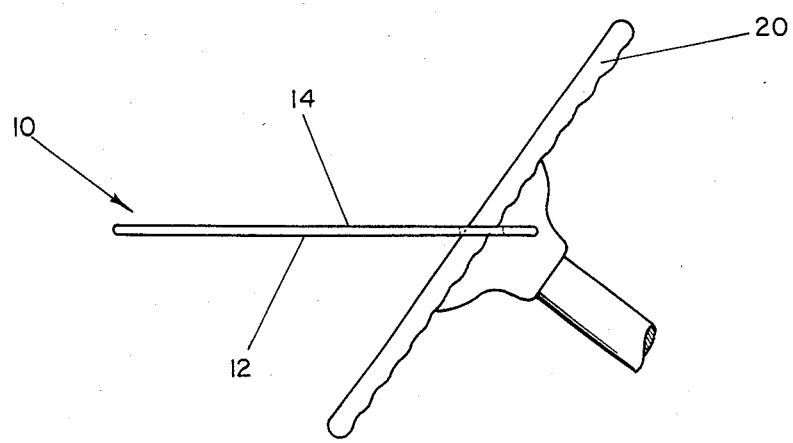
FIG—6

STEERING WHEEL PLATFORM

BACKGROUND OF THE INVENTION

1. Field of the Invention

The present invention relates to a platform which detachably mounts to and is supported by a vehicle steering wheel.

2. Description of Prior Art

Most people typically use a desk or some other flat rigid or semi-rigid supported surface on which to write, place reading materials or conduct other activities. Personnel in several professions, such as law enforcement officers, taxi drivers, and delivery personnel, frequently need to use a motor vehicle as the equivalent of an office. Apart from employment requirements, there are a variety of writing activities carried on within motor vehicles, such as writing of checks, letters, grocery lists, etc. Motor vehicles are not normally equipped with a writing platform.

As a result of the above mentioned and other recognized needs for a writing surface in a motor vehicle, a variety of writing devices supported by and attached to a motor vehicle steering wheel have been utilized in the prior art. Examples of such devices are disclosed in U.S. Pat. Nos. 1,717,433 entitled Writing Desk, to Bragg et al.; 1,883,714 entitled Portable Desk, to Gray; 1,977,507 entitled Steering Wheel Writing Case, to Edwards; 1,991,029 entitled portable Automobile Desk, to Pinney; 2,244,861 entitled serving table to Walker; 2,299,025, Steering Wheel Tray to McGinley; 3,643,606 entitled Table Structure for use in Motor Vehicles, to Vloe et al.; 3,739,478 entitled Steering Wheel Mounted Clip Board, to Elenberger; 3,952,988 entitled Steering Wheel Mounted Desk Board, to Easterly; 4,375,881 entitled Portable Desk for Use with Automobile Steering Wheel, to Mitchel; and 4,453,788 entitled Portable Desk, to Russel. Typically, these writing devices are somewhat bulky and are difficult to handle and store within a motor vehicle. Some of these devices are not readily and simply attached to and removed from the supporting steering wheel. Their means for attachment are often complicated and susceptible to damage. Many of these devices are designed to lay flat on the steering wheel rim. Most can be affixed in only one position relative to the steering wheel so that adjustment to an optimal angle is not possible.

The '433; '714; '507; '029; '025; '606; '478; '988; '881; and '788 Patents all disclose prior art devices which are attached to the steering wheel of a motor vehicle by means of clamps, clips, lugs, hooks, brackets or a yoke. Many of these attachment means are complex and require significant time and effort to effectuate either attachment to or removal from the steering wheel. Additionally, since the attachment means extend out from the edges of the devices, they are often susceptible to damage and make storage and handling more difficult and cumbersome.

Some of these prior art devices, such as those disclosed in the '606 and '788 Patents are adjustable in height or alternatively in the vertical angle relative to the steering wheel. However, none of these devices is adjustable in height and vertical and horizontal angles. None of these devices facilitates adjustment for use by either right-handed or left-handed individuals by having alternate angles of attachment which are natural for those individuals.

U.S. Pat. No. 2,244,861 discloses a device which attaches to the steering wheel of a motor vehicle and requires a brace which rests appurtenant to the steering column for support of the device. The device attaches by means of J-shaped slots and is not adjustable in either height or angle relative to the steering wheel. Additionally, it appears to fit only one grip size and one steering wheel diameter.

SUMMARY OF THE INVENTION

The invention provides a platform to be used in conjunction with a steering wheel. The versatile and portable platform of the invention is an improvement over prior art steering wheel devices in that the platform is far less susceptible to damage, handling is much easier than with prior art bulky devices having various hooks, clamps and clips, and the platform is adjustable to different positions to accommodate varying writing styles, left-handed and right-handed users, and comfort in seating.

The platform of the invention comprises generally planar top and bottom surfaces, two slots in the surfaces which engage with the steering wheel and at least two notches within one of the slots for allowing the platform to be tilted at varying angles relative to the steering wheel.

In the preferred embodiment, the platform is generally rectangular-shaped, having upper and lower edges and two side edges. The slots preferably open towards generally the same direction and are preferably substantially parallel to the upper and lower edges. Preferably the upper edge indents somewhat to accommodate the central portion or hub of the steering wheel. The slots are preferably outwardly divergent towards their openings. Preferably one slot is disposed in the upper edge and the other slot is disposed in one of the side edges. The notches are preferably curved to accommodate a steering wheel rim.

The platform of the invention can be easily positioned on and removed from a supporting steering wheel. The angle of the platform relative to the plane of the steering wheel is variable and adjustable. The slots of the platform can be placed anywhere on the rim of the steering wheel. Both surfaces of the platform are available for use with no modification in design or placement procedures. The invention is uniquely structured to receive Because of the above mentioned features of the invention, there is provided a platform which affords a large variety of writing positions, very simple attachment to and removal from the steering wheel rim, and writing comfort for both left- and right-handed users of various sizes.

The invention is not limited to use on a motor vehicle steering wheel but can be used wherever a flat surface is desired to serve as a desk, much like a conventional clipboard. The platform is easy to use and simple and inexpensive to manufacture.

Accordingly, it is a primary object of the present invention to provide a portable platform which is easily attachable to and removable from most vehicle steering wheels.

It is another object of the present invention to provide a portable platform which is adjustable to varying positions and angles.

Yet another object of the present invention is to provide a portable platform which is easy to use and inexpensive and easy to manufacture.

Other objects and further scope of applicability of the present invention will become apparent from the detailed description to follow, taken in conjunction with the accompanying drawing.

BRIEF DESCRIPTION OF THE DRAWING

FIG. 1 is a top view of the preferred embodiment of the invention;

FIG. 2 is a top view of an alternate embodiment of the invention;

FIG. 3 is a perspective view of the preferred embodiment of the invention attached to a steering wheel rim in an upwardly tilted horizontal position;

FIG. 4 is a perspective view of the preferred embodiment of the invention attached to a steering wheel rim in a downwardly tilted horizontal position;

FIG. 5 is a perspective view of the preferred embodiment of the invention attached to a steering wheel rim in a vertical position; and FIG. 6 is a side view of the invention attached to a steering wheel rim.

DESCRIPTION OF THE PREFERRED EMBODIMENTS

This invention relates to a portable platform primarily used in conjunction with a motor vehicle steering wheel. FIGS. 1 and 3-6 illustrate the preferred embodiment of the invention. FIG. 2 illustrates an alternative embodiment of the invention, having a somewhat different shape.

As depicted in the drawings, the steering wheel platform 10 of the invention preferably comprises generally flat top and bottom surfaces 12 and 14 respectively and two slots 16 and 18 opening in a generally common direction. One of the slots 16 is notched. The slots 16 and 18 engage the platform 10 with a steering wheel 20. The top and bottom surfaces 12 and 14 of the platform 10 are preferably flat so that either one may serve as a writing surface. The platform 10 is preferably structured so that it can be turned over, depending upon a user's preference, to put either surface 12 or 14 on top. Preferably the platform 10 is fairly thin so that it is not heavy and can be easily stored. Although the drawing illustrates a platform 10 which has completely flat top and bottom surfaces 12 and 14, the platform may be designed to contain various apertures or additions, such as a lower rim to prevent objects from sliding off the platform, pencil or pen holding devices, a clip for holding paper and forms, etc. The invention is not limited to the flat design shown in the drawing or the particular shapes illustrated.

Referring to FIGS. 1 and 2, the platform 10 comprises an upper edge 22, a lower edge 24 and two side edges 26 and 28. The upper edge 22 comprises one slot 16 and the side edge 26 comprises the second slot 18. The side edge 26 may be generally straight as shown in FIG. 1 or it may have several curves or edges as shown in FIG. 2. Preferably, both slots 16 and 18 open generally towards the same direction. Preferably, the upper edge 22 curves inward somewhat or contains an indentation 30 so that the platform 10 does not interfere with the central portion or hub of a steering wheel 20 engaged therewith. Preferably, all of the edges and corners are rounded and smooth to avoid injury to the user and steering wheel.

The two embodiments shown in FIGS. 1 and 2 illustrate different generally rectangular shapes for the platform 10 of the invention. Those skilled in the art will appreciate that other platform shapes having the two slots could also be used and that such shapes would achieve the purposes of the invention and are included in the invention.

Preferably, the slots 16 and 18 of the platform 10 outwardly diverge towards their openings to enable the platform 10 to be easily removed and positioned on the steering wheel 20 and to accommodate varying diameters and grip sizes of steering wheels 20. One of the slots 16 preferably comprises at least two notches to engage the steering wheel 20. The drawing illustrates three notches 32, 34 and 36, so that the platform 10 can be positioned at three different angles on the steering wheel 20; however, the platform can comprise as many notches as are desired to achieve varying positions. Preferably, the notches are in a similar curvature to that of the steering wheel rim and smooth to avoid damage to the steering wheel 20 and to aid in positioning the platform 10 on the steering wheel 20. The inner edges of the slots 16 and 18 may be lined with plastic, rubber, felt or some other material for added protection against steering wheel damage. FIGS. 3 and 4 illustrate two different angles of attachment due to the notches. FIG. 3 illustrates the platform 10 in an upwardly tilted position due to its positioning on the rim of the steering wheel 20 in the innermost notch 36. Likewise, FIG. 4 illustrates the platform 10 in a downwardly tilted position due to its positioning on the rim of the steering wheel 20 in the outermost notch 32. This variation in angle of attachment allows the platform 10 to be tilted for a user's comfort in writing and sitting behind the steering wheel 20.

The platform of the invention is primarily designed to be used in conjunction with most conventional vehicle steering wheels although the platform could be attached to other support members, such as a modified podium stand or the like. Those skilled in the art will appreciate the platform of the invention may be used on boats and aircraft as well as in ground vehicles. As used throughout the specification and claims, the term "steering wheel" is intended to include steering wheels as well as other supports and is not limited to the circular vehicle steering wheel configuration shown in the drawing.

Attachment of the platform of the invention to a steering wheel is accomplished by first choosing which surface 12 or 14 of the platform 10 is to be positioned on top, holding the platform 10 with the plane of the platform 10 being generally perpendicular to the plane of the steering wheel 20 and the upper edge 22 facing the steering wheel 20 and guiding the steering wheel rim 20 into the slots 16 and 18 of the platform 10. Lowering the lower edge 24 causes the steering wheel rim to be wedged within slots 16 and 18, holding the platform 10 securely in place. The wedging action is illustrated in FIG. 6.

The platform 10 may be positioned on the steering wheel 20 in generally horizontal positions, such as is shown in FIGS. 3, 4 and 6, or in a generally vertical position, such as is shown in FIG. 5. As used throughout the specification and claims, the term "horizontal" means that the slots 16 and 18 engage generally with the left and right sides of the steering wheel 20, and the term "vertical" means that the slots 16 and 18 engage generally with the top and bottom of the steering wheel 20, when the steering wheel 20 is generally stationary. The choice of position depends on the user's comfort in writing and sitting and whether the user is left-handed or right-handed. Although the drawing illustrates the platform in horizontal and vertical positions, other positions can be utilized depending on the user's desire. As discussed above, the angle of the platform 10 relative to the steering wheel 20 can be adjusted by positioning the steering wheel 20 in the various notches 32, 34 or 36. The platform 10 may be flipped so that the bottom surface 14 is positioned on top as illustrated in FIG. 6.

The platform 10, unlike prior art devices, can be placed on most motor vehicle steering wheels having varying diameters and grip thicknesses and at various angles relative to the steering wheels. The platform 10 is portable, can be easily stored in a vehicle while the vehicle is being operated, and is easily attachable and removable from the vehicle steering wheel.

The invention can be made of many different materials, including but not limited to plastic, metal, wood or rigid cardboard. The surface material should be smooth so that writing is not hindered.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A portable platform for detachable mounting on and support by a steering wheel having a rim comprising:
    a generally parallelogram-shaped platform member comprising an upper edge, a lower edge, a left side edge, a right side edge, and generally parallel planar top and bottom surfaces; and
    two generally parallel elongated, U-shaped steering wheel rim receiving slot means in said platform member, said slot means opening in a generally common direction, and positioned generally parallel to said upper and lower edges and disposed to be removably engagable with the rim of the steering wheel, one said slot means being disposed on one of said side edges and substantially near said upper edge of said platform member, and said other slot means being disposed on said upper edge and substantially near said other side edge of said platform member.

2. A portable platform in accordance with claim 1 wherein at least one said slot means comprises at least two steering wheel rim engaging notches therein for adjusting the position of said portable platform on the steering wheel rim and for preventing lateral slipping of said platform on the steering wheel.

3. A portable platform in accordance with claim 2 wherein said steering wheel rim engaging notches comprise curved portions, each fittable to a steering wheel rim.

4. A portable platform in accordance with claim 1 wherein at least one said slot means has an outwardly divergent opening for ease in receiving the steering wheel rim and for varying the position of said portable platform relative to the steering wheel.

5. A portable platform in accordance with claim 1 wherein said platform member is generally rectangular in shape.

6. A portable platform in accordance with claim 1 wherein said upper edge comprises an elongated indented portion generally extending between said steering wheel rim receiving slot means for avoiding interference with any hub the steering wheel may have.

* * * * *